United States Patent
Ando et al.

(10) Patent No.: US 7,308,479 B2
(45) Date of Patent: Dec. 11, 2007

(54) MAIL SERVER, PROGRAM AND MOBILE TERMINAL SYNTHESIZING ANIMATION IMAGES OF SELECTED ANIMATION CHARACTER AND FEELING EXPRESSION INFORMATION

(75) Inventors: Haru Ando, Kodaira (JP); Junichi Matsuda, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 941 days.

(21) Appl. No.: 10/601,954

(22) Filed: Jun. 24, 2003

(65) Prior Publication Data

US 2004/0038670 A1    Feb. 26, 2004

(51) Int. Cl.
G06F 15/16    (2006.01)
H04L 12/58    (2006.01)

(52) U.S. Cl. .................... 709/206; 455/412.1
(58) Field of Classification Search ............... 709/206; 455/412.1
See application file for complete search history.

(56) References Cited

U.S. PATENT DOCUMENTS

| 4,695,975 A | 9/1987 | Bedrij |
| 2001/0020247 A1 | 9/2001 | Ikeda et al. |

FOREIGN PATENT DOCUMENTS

| EP | 0 658 854 A2 | 12/1994 |
| JP | 7-334507 | 6/1994 |
| JP | 8-315185 | 5/1995 |
| JP | 9-81353 | 9/1995 |
| JP | 9-330319 | 6/1996 |
| JP | 2000-207313 | 12/1997 |
| JP | 2000-163337 | 11/1998 |
| JP | 11-346267 | 12/1998 |
| JP | 2000-207304 | 1/1999 |
| JP | 2000-214764 | 1/1999 |
| JP | 2001-325192 | 5/2000 |
| JP | 2002-73480 | 8/2000 |
| WO | WO 01/05152 A1 | 7/2000 |
| WO | WO 01/93509 A1 | 8/2000 |
| WO | WO 01/71925 A2 | 3/2001 |
| WO | WO 01/78334 A2 | 4/2001 |
| WO | WO 02/21287 A1 | 9/2001 |

*Primary Examiner*—Krisna Lim
(74) *Attorney, Agent, or Firm*—Reed Smith LLP; Stanley P. Fisher, Esq.; Juan Carlos A. Marquez, Esq.

(57) ABSTRACT

The mailing system of the invention converts the text information into movement information using animations, object information, and background information, and sends/receives the converted information as a mail. The system analyzes the information inputted or selected by a user, creates an animation movement by using the analyzed information, and selects an object and a background by using the analyzed information. The system sends/receives the created or selected animation movement information, object information, and background information as a mail, and displays the mail as if the sender and receiver were engaging in a dialogue.

19 Claims, 21 Drawing Sheets

Fig.9

| category name \ word number | 1 | 2 | 3 | 4 | |
|---|---|---|---|---|---|
| Place (fixed) | Shinjuku | Shibuya | XX coffee shop | XY department store | .... |
| Name of cuisine | French | Japanese | Italian | Indian | .... |
| Event | Admission into a school | Graduation | Thank-you party | Contact | .... |
| Communication means | Telephone | Mail | Letter | Postcard | .... |
| Object | Book | Bag | Cup | Calculator | .... |
| Numeric_month | 1-12 | | | | |
| Numeric_day | 1-31 | | | | |
| Numeric_floor number | 1-80 | | | | |
| Material of cooking | Pike conger | Tempura | Carry | Laumen | ..... |
| Place (real-time) | Here | This way | | | .... |
| Movements | Eat | Run | Think | Write | .... |
| ⋮ | ⋮ | ⋮ | ⋮ | ⋮ | |

Fig.10

| Word | | Associated data | | | |
|---|---|---|---|---|---|
| | | Character movement | | Object | Background |
| 1001 | 1002 | General mode | Sign language mode | | |
| Work | Construction | Mov_work_kouji | Hand_work_kouji | | |
| | Field | Mov_work_agri | Hand_work_agri | | |
| | Desk | Mov_work_desk | Hand_work_desk | | |
| Tired | | Mov_tired | Hand_tired | | |
| Brow up | | Mov_browup | Hand_browup | | |
| Time | | | | Clock_1 | |
| XX coffee shop | | | | Cup_1 | Back_XX coffee shop |
| Meet [ ] by appointment | | Mov_appointment | | | |
| Bus | | | Bus_1 | | |
| Paris | | | | | Back_Paris |
| Shinjuku | | | | | Back_Shinjuku |
| Laumen | | | | Laumen | |
| Eat | Rice | Eat_Rice | Hand_Eat_Rice | | |
| | Laumen | Eat_Laumen | Hand_Eat_Laumen | | |
| | French | Eat_French | Hand_Eat_French | | |
| | | | | | |

Fig.12

| Positional information | | Object information | Background information |
|---|---|---|---|
| Longitude | Latitude | | |
| A0° m0' | B0° n0' | Shape_Cofeecup | Back_a XX coffee shop |
| A0° m1' | B0° n1' | Shape_a XX university | Back_Hachiouji |
| A0° m2' | B0° n2' | | Back_a XX park |
| A0° m3' | B0° n3' | ROGO_XX shop | Back_Aoyama |
| A0° m4' | B0° n4' | Shape_XY building | Back_Shinjuku |
| A0° m5' | B0° n5' | Shape_XX building | Back_Asakusa |
| ⋮ | ⋮ | ⋮ | ⋮ |
| Ai° j' | Bi° nj' | Shape_effel | Back_Paris |

Fig.13

| number | typical text group | number of variable parts | movement pattern of typical part | variable part [i] (i = slot number) category | | | slot word menu | | |
|---|---|---|---|---|---|---|---|---|---|
| | | | | variable part [1] | variable part [2] | variable part [3] | variable part [1] | variable part [2] | variable part [3] |
| 1 | let's eat [ ] at [ ]. | 2 | m_1_1<br>m_1_2 | place | Name of cuisine/name of cooking material | | Shinjuku<br>Aoyama<br>Ginza<br>XY department store<br>... | Italian<br>Chinese<br>pot of canard viande and vegetable stews<br>oyster<br>... | |
| 2 | We'll be meeting at [ ]. | 1 | m_2_1 | place | | | Square before Hatikoh<br>XX coffee shop<br>XY plaza<br>... | | |
| 3 | [ ] is held on [ ] [ ]. | 3 | m_3_1 | Numeric_ month | Numeric_ day | Event | 1-12 | 1-31 | Party<br>off-line meeting<br>... |
| 4 | Congratulations! [ ] | 1 | m_4_1 | Event | | | Birthday<br>Admission to a school<br>... | | |
| 5 | Give me a [ ] when you arrived at [ ]. | 2 | m_5_1 | place | Event/communication means | | Station<br>Home<br>... | message<br>mail<br>... | |
| 6 | I made a trip to [ ]. | 1 | m_5_1 | place | | | Hakata<br>Sado<br>... | | |
| 7 | I'm waiting for you at [ ]th floor of [ ]. | 1 | m_5_1<br>m_5_2 | place | Numeric_floor number | | Here<br>XY department store<br>... | 1-100 | |
| ..... | ..... | ..... | ..... | ..... | ..... | ..... | ..... | ..... | ..... |

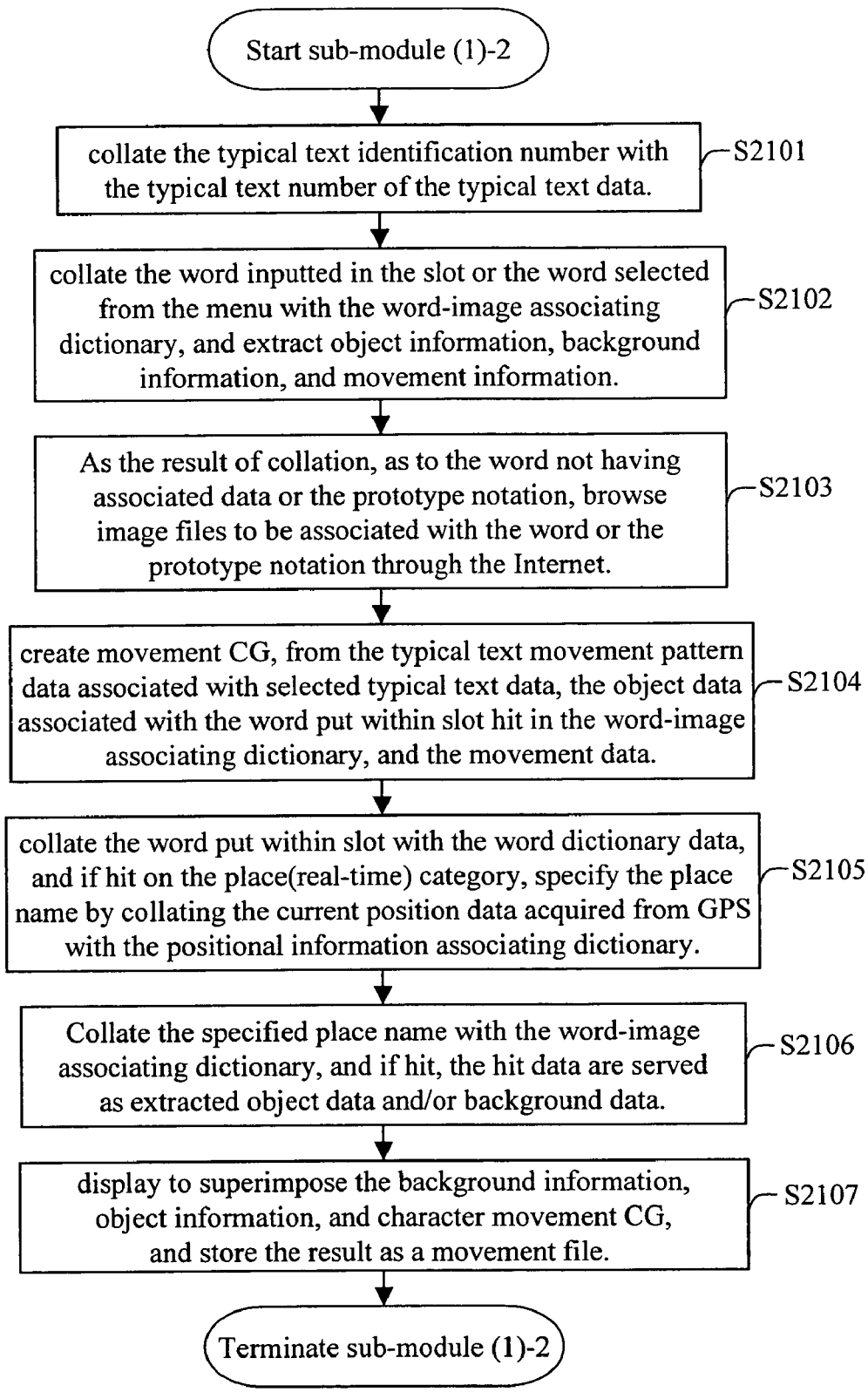

MAIL SERVER, PROGRAM AND MOBILE TERMINAL SYNTHESIZING ANIMATION IMAGES OF SELECTED ANIMATION CHARACTER AND FEELING EXPRESSION INFORMATION

BACKGROUND OF THE INVENTION

1. Field of the Invention

The present invention relates to a mobile terminal and a mail server that create animations and send/receive created animations as mail information.

2. Description of the Related Art

In recent years, the widespread of mobile telephones and the Internet has allowed the users to send/receive information at any time and place. However, since the display area of a mobile telephone or a mobile terminal is small, the weak-sighted users feel difficulty in reading the texts, which is the problem. In such a case, a countermeasure to enhance the visual is made by means of increasing the point (size) of the character. Increasing the character point will however limit the contents to be displayed on one screen, which frequently makes it difficult to grasp the whole image of the received contents. Also, the electronic mail has increasingly been used among people with hearing difficulties, owing to the mail function through mobile telephones. However, since the communications between people with hearing difficulties normally use the sign language, the electronic mail does not furnish such a natural feeling as people with sound hearing write the mail in the speech dialogue.

If people become able to understand sent/received information by intuition without relying on the text, it is conceivable that the weak-sighted users also become able to send/receive information easily and swiftly by means of mobile equipment such as a mobile telephone or a mobile terminal. Accordingly, in addition to the text information that have conventionally been used for the transmission/reception, a means of expression becomes necessary which makes people easily understand the sent/received information by the visual, using media except the text information. Further, the conventional text information is not easy to send feeling information, which creates misunderstandings between the sender and the receiver; accordingly, the information has been using a face mark such that the expression of a face is given by a mark. However, the face mark does not produce a value in use, unless both the sender and the receiver understand the mark. Therefore, there must be a means capable of sending/receiving the feeling information much more intuitively than the face mark. Further, the text information involves much information that the people with difficulty in hearing, especially the people who use the sign language in usual conversations cannot easily understand. Therefore, there arises a necessity of a means that compensates the information that are expressed in the sign language, which are missed when the expression by the sign language is translated into a text, and also a means that expresses the information by an intuitively understandable system.

SUMMARY OF THE INVENTION

It is therefore an object of the invention to provide a mailing system that meets the above requirements.

In order to accomplish the above object, the inventors develop an interactive animation mailing system that permits the user to express the text information inputted by the user and the feeling information by using the animation information by a character selected by the user, the object information, and the background information, and to intuitively understand the sent information by sending the expressed information to a designated destination, if the receiver at the destination does not read the whole text information.

According to one aspect of the invention, the mail server is connected to a mobile terminal through a network, and possesses a control unit and a storage unit. The storage unit stores words and display information associated with the words as a word-image associating dictionary. The control unit controls the processing of: receiving an ID code of the mobile terminal, character information, text information, and selected expression information from the mobile terminal, dividing the text into unit of a word, synthesizing an animation image of the character by using the display information and the expression information associated with the word, and outputting the animation image to the mobile terminal.

The storage unit may be made to further store a typical text and a movement pattern associated with the typical text; and the control unit may be designed to make the mobile terminal display the typical text, receive the text information to be put in a blank space of the typical text, and synthesize the animation image of the character by using the movement pattern associated with the typical text in addition to the display information and the expression information associated with the word. Further, the storage unit may be made to record the ID code of the terminal and the character information associated with the ID code; and the control unit may be designed to control the processing of reading the character information associated with the received ID code from the storage unit, instead of receiving the character information.

It is preferable that the storage unit stores a word dictionary that stores plural words to be divided into categories, and a positional information associating dictionary that stores positional information and place display information associated with the positional information, and the control unit controls, when the word belongs to the category of place in the word dictionary, the processing of extracting the place display information from the positional information associating dictionary by using the positional information acquired from the mobile terminal, and outputting the place display information extracted.

It is preferable that, when the word-image associating dictionary does not contain the word, the control unit further controls the processing of retrieving an object associated with the word through the network. And, the control unit may be designed to control the processing to make the mobile terminal display plural character candidates and select any of them, prior to the processing.

When the mail server receives a reply request from a destination terminal of the mail, the mail server may receive designation information given in an insertion portion provided in the text of the received mail, may create the character animation image by using the inputted text information in regard to the reply mail, may make the transmission terminal output the created animation image data to be inserted into the insertion portion.

According to another aspect of the invention, the program for making a mobile terminal having a control means, display means, storage means, and network interface execute a mail creation processing. Here, the mail creation processing includes the steps of: accepting a text input; making the display means display plural feeling information, and select the feeling information associated with the text; outputting the feeling information and the text information together with an ID code of the mobile terminal to a server through the network interface; acquiring animation information created by the outputted information and the character information recorded in the server, associated with the ID code of the mobile terminal; and making the display means display the animation information.

According to another aspect of the invention, the mobile terminal connected to a network includes: a recording means that records character information; a display means; a text input means; a means that divides a text inputted through the text input means into plural words; a means that retrieves an object associated with the word; a means that synthesizes an animation image of the object recorded in the recording means by using the object; and a means that sends the synthesized animation to a designated destination through the network. Further, the recording means may record information for expressing plural feelings, and may use the feeling information selected through the text input means for synthesizing the animation image.

According to one embodiment of the invention, the mail server being the information processing device includes: an information input means that allows a user to input information such as a text at least; a data selection means that allows the user to select data by a pointing device and/or a button; an information storage means that stores input information such as a text, animation information, object information, and background information, etc.; a display means that displays these text information, animation information, object information, and background information, etc.; and a data communication means that sends/receives data by using the telephone line and the like. In this information processing device, first the user sets a personal character on a character selection screen. The character selection screen contains plural characters displayed, and the user selects one character among the characters to set.

Next, as the user selects, on an animation creation screen, whether the user arbitrarily inputs text information, or the user selects one typical text among the displayed typical texts and inserts the text information into a slot portion of the selected typical text, from the options given to each slot, the input text information is determined. Further, as the user sets a feeling expression symbol by each text at the position of the feeling information to be laid out, the feeling information is determined.

Next, when the input information is arbitrary text information, the text is morphologically analyzed. The word information and the feeling information extracted by the morphological analysis are served to retrieve the movement animation information, object information, and background information of the already set character to be associated with the above information extracted. When the user inputs a text by using the typical texts prepared, on the other hand, the selected typical text, the inputted or selected text information within the slot, and the feeling information are served to select the movement animation information, object information, and background information of the already set character. Finally, these movement animation information, object information, and background information are integrated into a mail file.

Next, as the created mail file is sent to a designated destination, the mail file is displayed on the display of the receiver-side terminal. When the speech of both the sender and receiver sides are given already in the mails, the movement by the character of the sender and the movement by the character of the receiver are displayed with movements according to the order of the speech.

According to the invention, the text information is expressed by means of the movement information using animations, object information, and background information; thereby, the received information can be understood more intuitively, and the transmission/reception of information can be made speedy and memorable.

According to the invention, as the user inputs text information and feeling symbol information, the text information can be converted into the expression format by the movement information, object information, and background information. Owing to the information expressed by the expression format, the user becomes able to understand the sent information without reading the whole texts written in a small font. It is also possible to adapt the movement information to the sign language movement, and the users of the sign language become able to confirm the information by the sign language animation by switching the animation mode.

When creating a reply mail, the animation, object data, and background data of the quoted parts are reproduced with regard to the quoted parts, and they can be displayed according to the occurrence order with the newly created parts, which realizes a display as if the sender and receiver of the mail were engaging in a dialogue.

BRIEF DESCRIPTION OF THE DRAWINGS

FIG. 9 illustrates an example of the data structure of the word dictionary data;

FIG. 10 illustrates an example of the word-image associating dictionary data;

FIG. 12 illustrates an example of the positional information associating dictionary data;

FIG. 13 illustrates an example of the data structure of typical texts;

FIG. 21 illustrates an example of the processing flow according to the invention.

DETAILED DESCRIPTION OF THE PREFERRED EMBODIMENTS

The preferred embodiments will be described with reference to the accompanying drawings. The system according to the invention mainly deals with movement information using animations, object information, background information, and so forth. The system translates a text inputted by a user into information such as cartoon characters, objects, and backgrounds, reconstructs these information items as mail information, and sends/receives the reconstructed information on the electronic mailing system.

Figure 1:
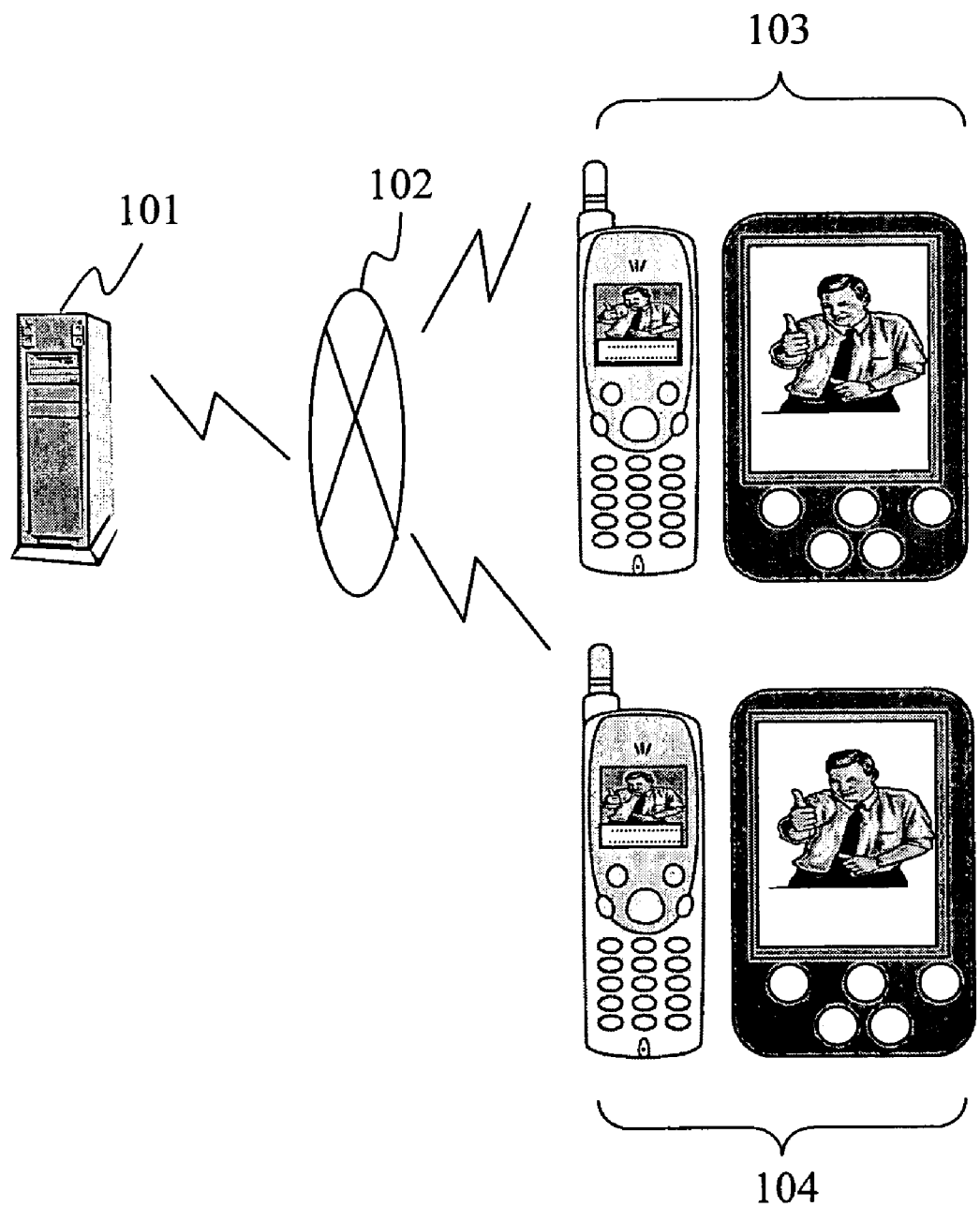
FIG. 1 illustrates a configuration of the animation mailing system according to the present invention.

FIG. 1 illustrates a configuration of the system according to the invention. The system includes a mail server 101 that creates animation mails and sends/receives the created animation mails, a communication network 102 that sends/receives data inputted by users and animation data and so forth, a mobile telephone for sending mails or a mobile terminal 103 (hereunder, generally called mobile terminal), and a mobile terminal 104 for receiving mails. The mobile terminals 103 and 104 incorporate a position detection function such as the PHS function or the GPS function that detects the current position of the terminal.

When a user inputs data with the sending mobile terminal 103, the data inputted by the user and the position data detected by the position detection function are sent to the mail server 101 through the communication network 102 such as the Internet. Next, the mail server 101 analyzes the input data, creates animations associated with the input data on the basis of the analyzed result, and retrieves object data and background data associated with the input data. Further, the mail server 101 synchronously synthesizes the created animations and the retrieved object data and background data into an animation file, for example, and sends the animation file to the sender-side mobile terminal 103 through the communication network 102.

The user of the mobile terminal 103 confirms the sent animations, and designates the destination for the animation file. If the user designates the mobile terminal 104 as the destination, the animation file is sent to the designated mobile terminal 104 through the communication network 102, and finally the user at the destination of transmission confirms the received animation data on the display of the mobile terminal 104. In this case, the function to create the animation data and the function to retrieve the object data and background data may be assigned to the mail server 101, or may be assigned to the mobile terminals 103, 104. Also, the synchronous synthesizing function may be assigned to the mail server 101, or may be assigned to the mobile terminals 103, 104. Here, it is assumed in the description that the function to create the animation data, the function to retrieve the object data and background data, and the synchronous synthesizing function are assigned to the mail server 101.

Figure 2:
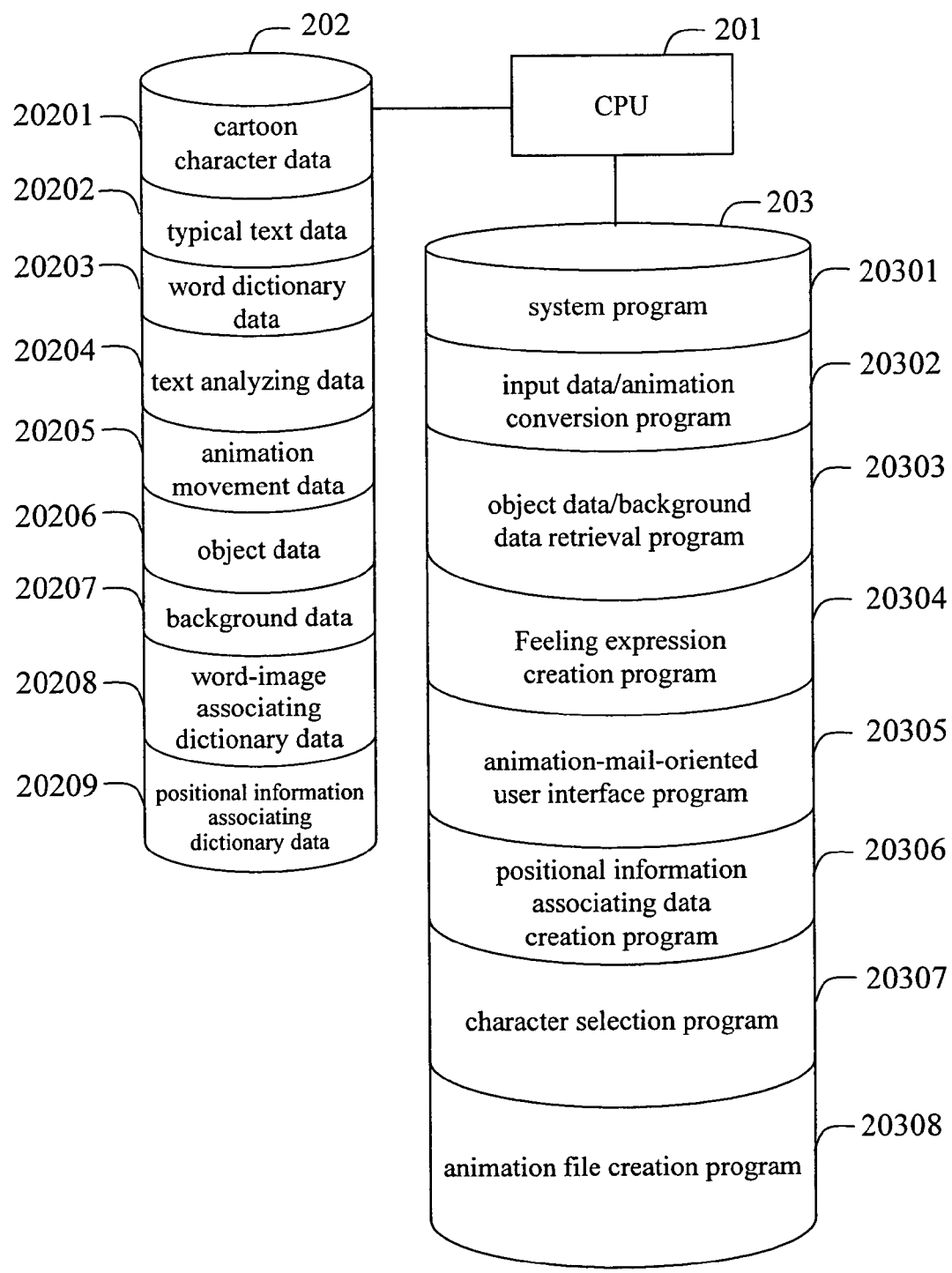
FIG. 2 illustrates a configuration of the mail server according to the invention.

Next, the mail server 101 will be described with reference to an example of the configuration illustrated in FIG. 2. The mail server is provided with a CPU 201 that executes the processing according to a program started, a hard disk 202 that stores data, etc., and a memory 203 that stores the program started and so forth. Accessed data are read into the memory 203 as needed, and the CPU 201 executes the data processing based on the invention. The hard disk 202 stores cartoon character data 20201, by which a user selects the favorite cartoon characters, typical text data 20202 that the user utilizes when creating a mail, word dictionary data 20203 that describe words category by category, text analyzing data 20204 to be used for analysis of inputted arbitrary texts, animation movement data 20205 that describe the movements expressed by the animations by each movements, object data 20206 being the object description data represented by clip arts, etc., background data 20207 served as the backgrounds for the animations, word-image associating dictionary data 20208 that describe the associations of the words with the display information of the words (the display information may be animation data), and positional information associating dictionary data 20209 that describe the associations of the positional information expressed by the longitude and the latitude with the object information and the background information.

The memory 203 stores a system program 20301 that controls the whole system with the start-up of the mail server, an input data/animation conversion program 20302 that converts input data by the user into animations, an object data/background data retrieval program 20303 that retrieves the object information and background information associated with the data inputted by the user, a Feeling expression creation program 20304 that creates the feeling expression information associated with the data inputted by the user, an animation-mail-oriented user interface program 20305 being a user interface program for inputting data to create animation mails and sending/receiving the mails, which is downloaded when the user first makes use of an animation mail, a positional information associating data creation program 20306 that creates data associated with the current position of the mobile terminal 103, a character selection program 20307 that allows the user to select the favorite cartoon character, and an animation file creation program 20308.

The processing of the mail server and the mobile terminal according to the invention will be described with reference to the flow charts illustrated in FIG. 16 through FIG. 21.

First, the mail server 101 is started by, for example, the manager of the server. It is premised that the mail server is always operational.

Figure 3:
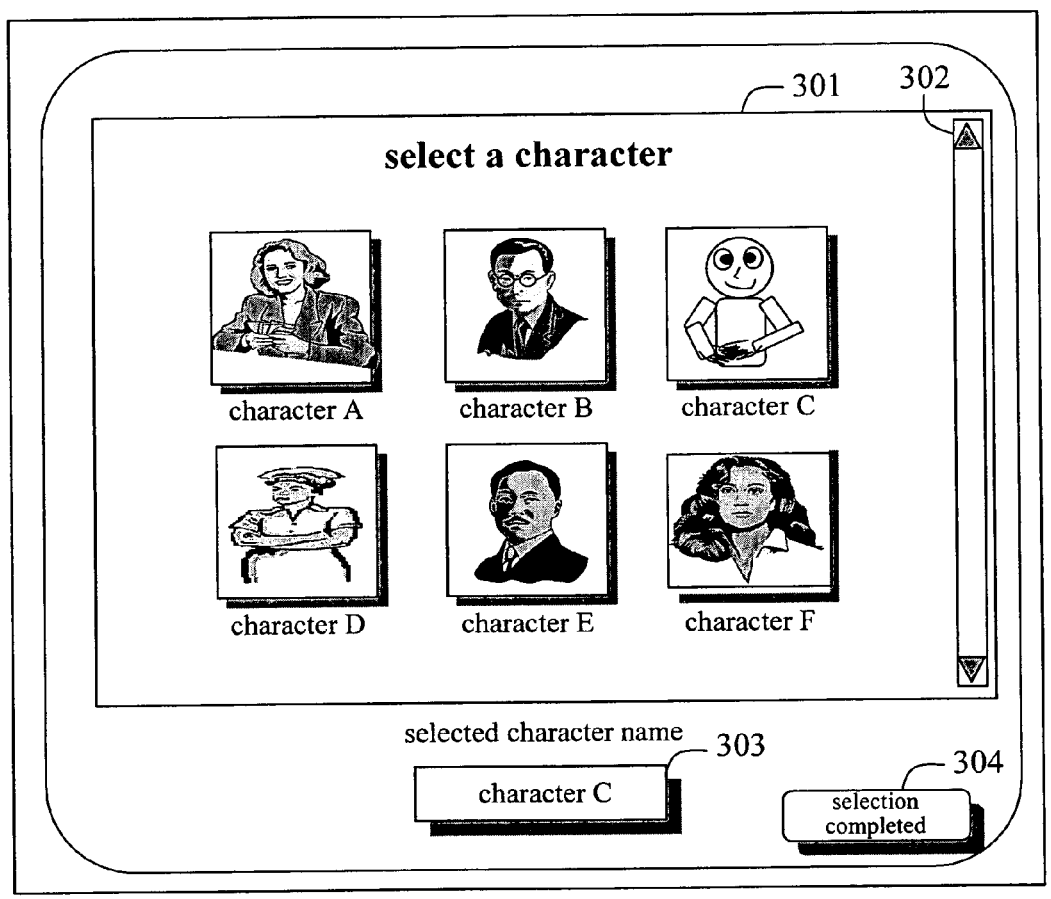
FIG. 3 illustrates an example of the screen for selecting characters according to the invention.

Next, the user of the mobile terminal 103 turns on the main power of the mobile terminal, and connects the mobile terminal with the Internet. The user downloads the animation-mail-oriented user interface program 20305 through the Internet. When the user starts the program downloaded (S1601), and when the user has not yet set the character, the character selection program 20307 is started (S1602), and the terminal is automatically connected to the character setting web page of the mail server 101 through the Internet 102. The user selects a favorite character among plural characters displayed on a character display screen 301 of the web page as shown in FIG. 3. In this case, it is also possible that the user selects plural characters to download them into the mobile terminal.

This embodiment premises that the user selects one character. For example, when the user selects the character C on the display, plural characters are displayed with the movement of a character selection scroll bar 302 (S1701), the user finally selects the character C by the pointing device or the finger (S1702), and the selected 'character C' is displayed in a frame 303 for "selected character name". When the user determines the character at this stage, as the user pushes a 'selection complete' button 304 (S1703), the character setting is completed, and the identification number of the selected character and the user address or the ID code are sent to the mail server 101 (S1704); and the processing is transferred to the animation mail transmission/reception screen as illustrated in FIG. 4.

Figure 4:
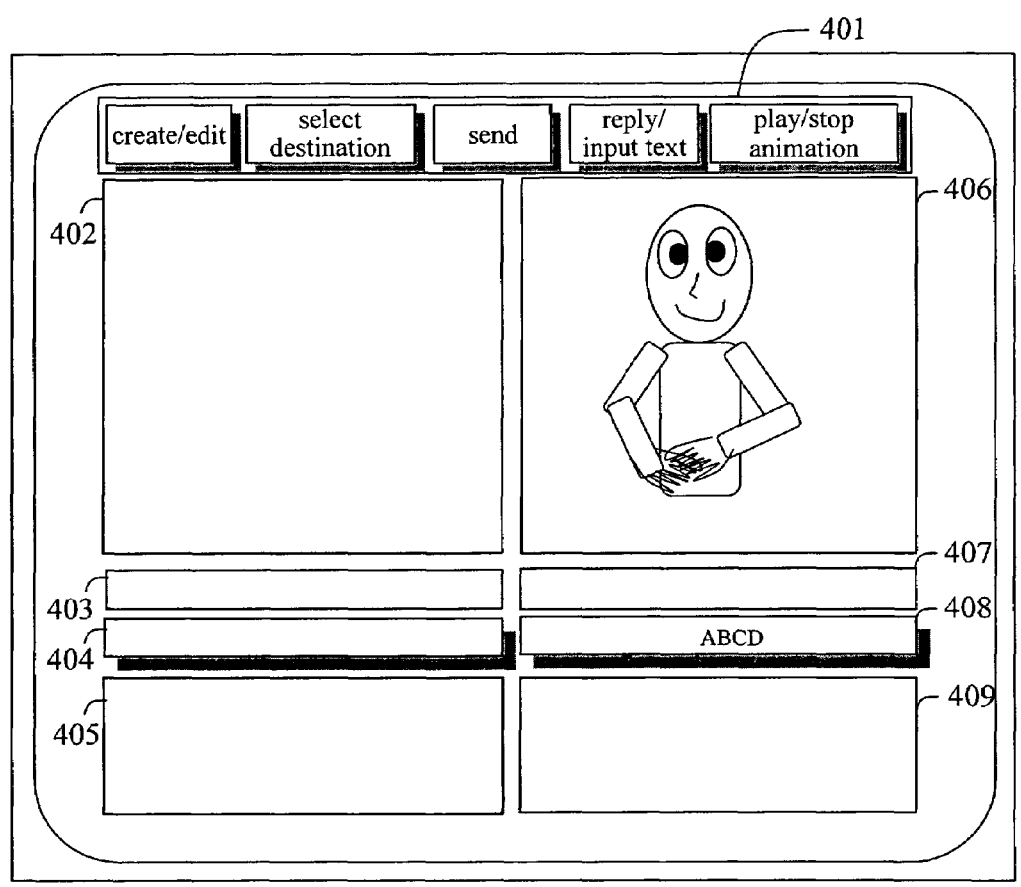
FIG. 4 illustrates an example of the display screen according to the invention.

The animation mail transmission/reception screen as illustrated in FIG. 4 displays a menu 401 on the upper part thereof, the right half thereof serves as the screen for the sender side, and the left half thereof serves as the screen for the receiver side. The receiver-side screen is composed of a receiver-side character display screen 402, an animation/text associating display screen 403, a receiver-side talker name display screen 404, and a mail list display screen 405. The sender-side screen is composed of a sender-side character display screen 406, an animation/text associating display screen 407, a sender-side talker name display screen 408, and a mail text display screen 409. The receiver-side character display screen 402 displays a received animation, and the animation/text associating display screen 403 displays a text associated with the received animation. The receiver-side talker name display screen 404 displays the information of name or nickname of a person who sent the animation mail. The mail list display screen 405 lists the titles of received mails. On the other hand, the sender-side character display screen 406 displays an animation now being created, and the animation/text associating display screen 407 displays a text associated with the animation now being created. The sender-side talker name display screen 408 displays the identifying information of name or nickname of the sender. The mail text display screen 409 displays the whole text of the mail to be sent. The animation/text associating display screen 407 displays the text of a part displayed on the current character display screen 406 among the mail texts displayed on the mail text display screen 409.

As the identification number of the selected character is sent to the mail server 101, the server sends the still picture of the character to the sender-side mobile terminal 103, and the sender-side character display screen 406 displays the selected character. During setting the character, the pertinent data thereto can be downloaded into the mobile terminal. Or, it is also possible that the mail server is designed to manage the selected character information together with the ID of the mobile terminal, and thereafter, whenever connected to the mail server, to automatically display the character associated with the ID of the mobile terminal on the display of the mobile terminal. When the character is already set up, the processing advances to the mail creation/transmission screen (S1603).

Figure 5:
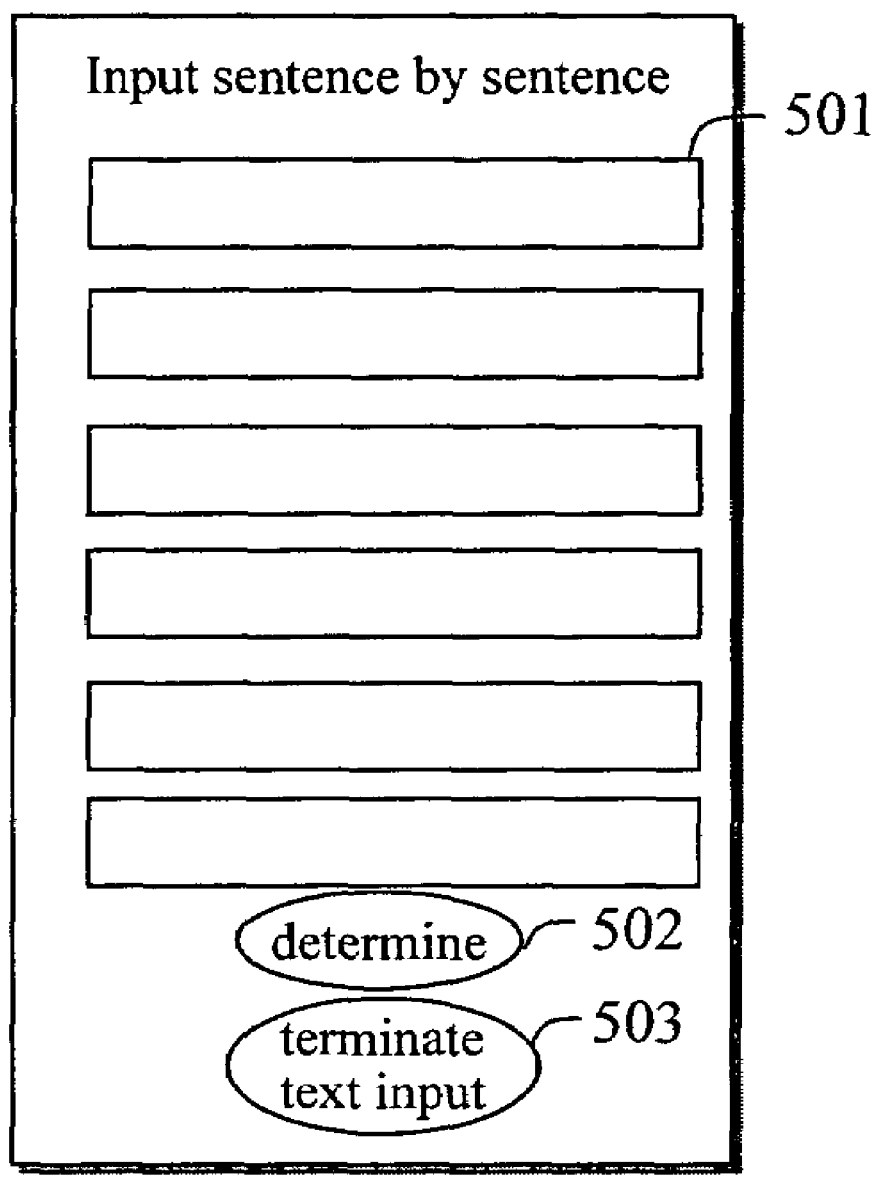
FIG. 5 illustrates an example of the screen for inputting arbitrary texts.
Figure 6:
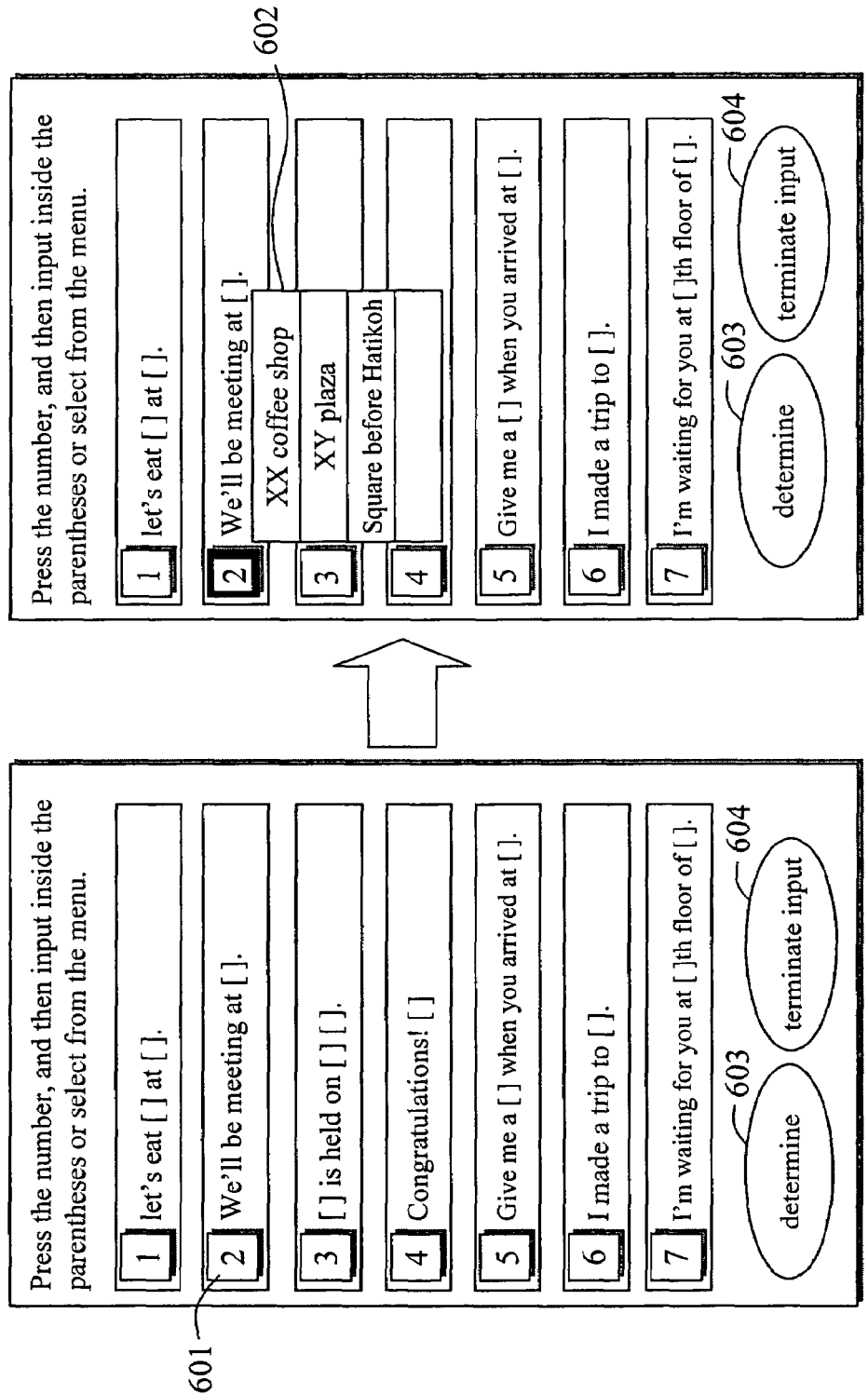
FIG. 6 illustrates an example of the screen for inputting typical texts.

Next, the processing of a new creation of mail will be described. In case of newly creating a mail, the user selects the menu 'create' among the menu 401 illustrated in FIG. 4 by means of the pointing device or the finger. As the menu 'create' is selected, a screen for the user to select the arbitrary text input or the typical text input is displayed (S1801). If the arbitrary text input is selected, a screen for inputting an arbitrary text as illustrated in FIG. 5 is displayed (S1802). If the typical text input is selected, a screen for inputting a typical text as illustrated in FIG. 6 is displayed (S1803).

In the beginning, the processing of inputting an arbitrary text will be described. As shown in FIG. 5, the user inputs a text in unit of a sentence. For example, the user inputs 'let's eat Laumen at Shinjuku' in a text input space 501, and presses the 'determine' button 502. As the 'determine' button 502 is pressed, the inputted text information is stored in text[i](i(0–m)=text number) according to the order inputted. In this case, text[0]='let's eat Laumen at Shinjuku'.

Figure 7:
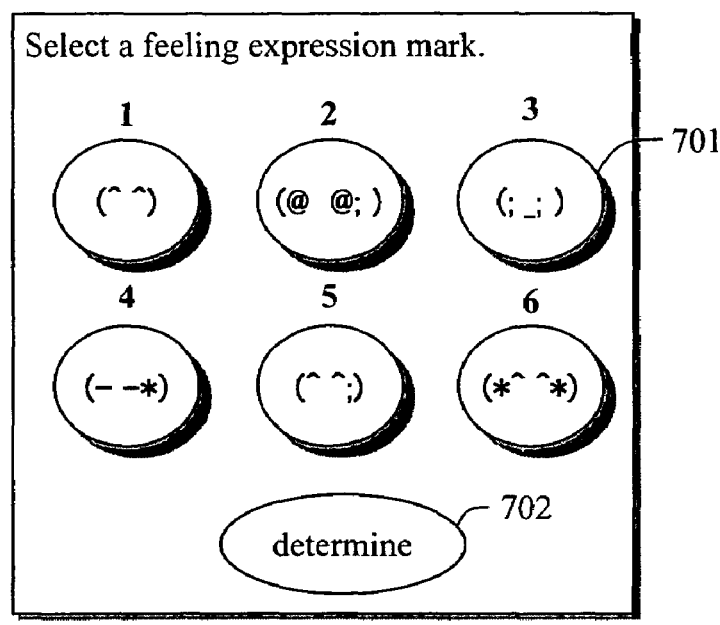
FIG. 7 illustrates an example of the method for designating feeling expression marks.

As the 'determine' button 502 is pressed here, a selection screen for feeling expression marks as illustrated in FIG. 7 is displayed. The user selects a desired mark by the pointing device or the finger, among the Feeling expression buttons 701 corresponding to the feeling expression marks displayed, and presses the 'determine' button 702 (S1804). As the 'determine' button 702 is pressed, the mark number given to each of the feeling expression marks is stored in Mark[i](i=text number), and the processing returns to the screen for inputting the arbitrary text in FIG. 5. In case of inputting plural sentences, the user repeats a series of operations such as inputting sentence by sentence in the text input space 501, pressing the 'determine' button 502, and designating the feeling expression mark.

Figure 8:
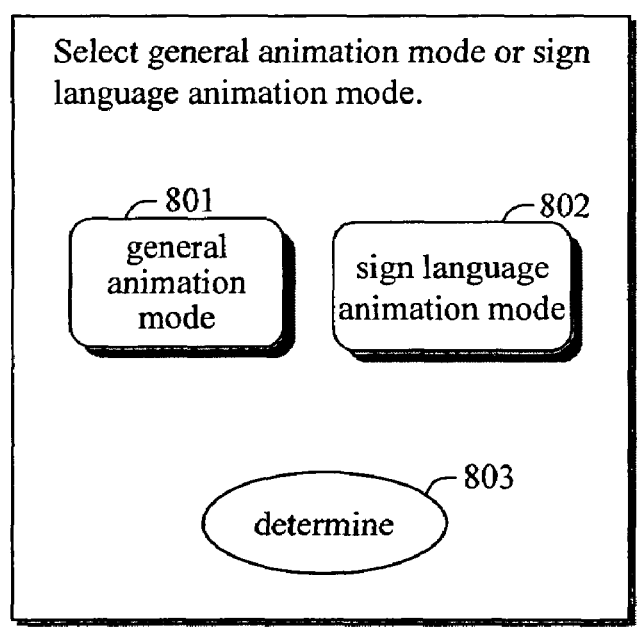
FIG. 8 illustrates an example of the method for selecting the mode of animation.

As the user presses the button 503 for terminating the text input (S1805), the animation mode selection screen is displayed as shown in FIG. 8. Here, the user is to select whether to display the animation showing the general movement, or to display the animation showing the sign language movement. As the 'general animation mode' 801 is selected, the animation mode identifier 'ani=0' is stored in the memory. As the 'sign language animation mode' 802 is selected, the identifier 'ani=1' is stored. Here, it is assumed that the identifier 'ani=0' being the 'general mode' is sent. When the user presses the 'determination button' 803 at this stage, the mail server 101 receives the text arrangement information text[i], the feeling expression mark information Mark[i], and the animation mode information Ani. Further, the position detection function incorporated in the mobile terminal detects the current position of the terminal at the very moment that the user pressed the determination button, and the (x, y) coordinates that give the longitude and the latitude of the current position are stored in the geo[p][q] (p: x-coordinate, q: y-coordinate), which are sent to the mail server 101 (S1806).

Next, the mail server 101 executes the text analysis by means of the input data/animation conversion program 20302, and creates the animation (S1807). The objective text at this stage not only includes the text text[i] inputted by the user, but also includes the text information inputted as the subject heading, and it is possible to induce animation data by analyzing the text information of the subject heading. In this example, the explanation is made on the assumption that the object is the text information inputted as the body by the user. When the text arrangement information text[i], the feeling expression mark information Mark[i], the animation mode information Ani, and the current positional information geo are sent, the text analysis is executed to the text arrangement information text[i] in the first place.

The text analysis divides an inputted text into words by a morphological analysis method such as the morphological analysis system 'ANIMA' (design and evaluation of a morphological analysis program ANIMA written by Hirofumi Sakurai and Toru Hisamitsu, from the theses at No.54 national meeting of the Information Processing Society, $2^{nd}$ Apr. 1997), and stores the information on the parts of speech of words and the conjugations thereof as the word information structure ani_txt[i][j](i=word occurrence number, j=type of information (1=notation of word, 2=notation of end-form, 3=part of speech)). In this example, from 'let's eat Laumen at Shinjuku' are extracted Shinjuku, at, Laumen, wo, let's eat as the notation of word. Further, as the notation of end-form to each words are extracted Shinjuku, at, Laumen, wo, eat. Further, as the part of speech are extracted 'noun', 'postpositional word functioning as an auxiliary to a main word', 'noun', 'postpositional word functioning as an auxiliary to a main word', and 'verb', which are stored in the Ani_txt array (S2001). Next, the independent words such as 'noun', 'verb', and 'adjective verb' are selected among the Ani_txt information, and the notations of end-form of the words are collated with the words of the word dictionary data 20203 stored in the hard disk 202 (S2002).

The structure of the word dictionary data 20203 is composed of the word number and the category name, as shown in FIG. 9. In this example, 'Shinjuku', 'Laumen', and 'eat' are extracted as the result of collation, which are stored in hit_tango[s](s=order of word) in the occurrence order. If there was not a word hit in the word dictionary data, the word or the image file of the same name as the original notation of the word is searched through the Internet. If it is hit, the image file can be handled as the object data or the background data (S2003). If this search did not bring out appropriate data, it is also possible to inform the user that the data were not found, and to make the user select the background data and the object data. Next, the processing collates hit_tango with the word-image associating dictionary data 20208 (S2004). The word-image associating dictionary data describe the name of a character movement file, the name of an object file, and the name of a background file as the data associated with individual words. Especially, the character movement file takes on the data format that allows the edition of the movement file, so that the file can use the data format disclosed in the JP-A No. 315185/1996, for example.

Here, the object data/background data retrieval program 20303 is started. If plural words such as 'work' (1001), 'construction', 'field', 'desk' (1002), etc., are filled in the column 'name of word' of the word-image associating dictionary data illustrated in FIG. 10, the retrieval is made to the word 1001 written in the first place, and next to the word 1002 written in the second. When all of the plural words are hit, the pertinent movement, object, and background are extracted. As the result of collation, 'Eat_LAUMEN' as the animation movement associated with 'Ani=0', 'eat', and 'Laumen', 'Laumen' as the object, and 'Back_Shinjuku' as the background are selected in this example. If Ani=1, 'Eat_LAUMEN_hand' being the sign language animation data is selected, and the sign language movement is created from the data.

Next, in regard to the Mark data being the feeling information data, the edition of 'Eat_LAUMEN' as the animation movement data is carried out with the Feeling expression creation program 20304. As the Mark data are sent, the Feeling expression creation program fetches the movement data 'Eat_LAUMEN' stored in the animation movement data. Next, the expression data associated with the Mark data are created, which are stored as the movement data 'Eat_LAUMEN' with the Mark data added on (S2007). This edition is allowed to use the Feeling expression creation program having the animation edition function, such as the sign language edition software 'Mimehandll'.

Next, the animation file creation program 20308 is started, the data associated with the animation movement, the object, and the background are retrieved from the animation movement data, the object data, and the background data, and the animation file having the retrieved data superimposed is created (S2008). For example, the background is served as the backmost layer, the object layer is created on the background, and the animation movement layer is laid on the object layer; and all of these layers are integrated into one animation file, which is converted into the File_1 of the GIF format, for example. The converted file is sent to the mobile terminal 103 as the transmission source (S1808).

Figure 11:
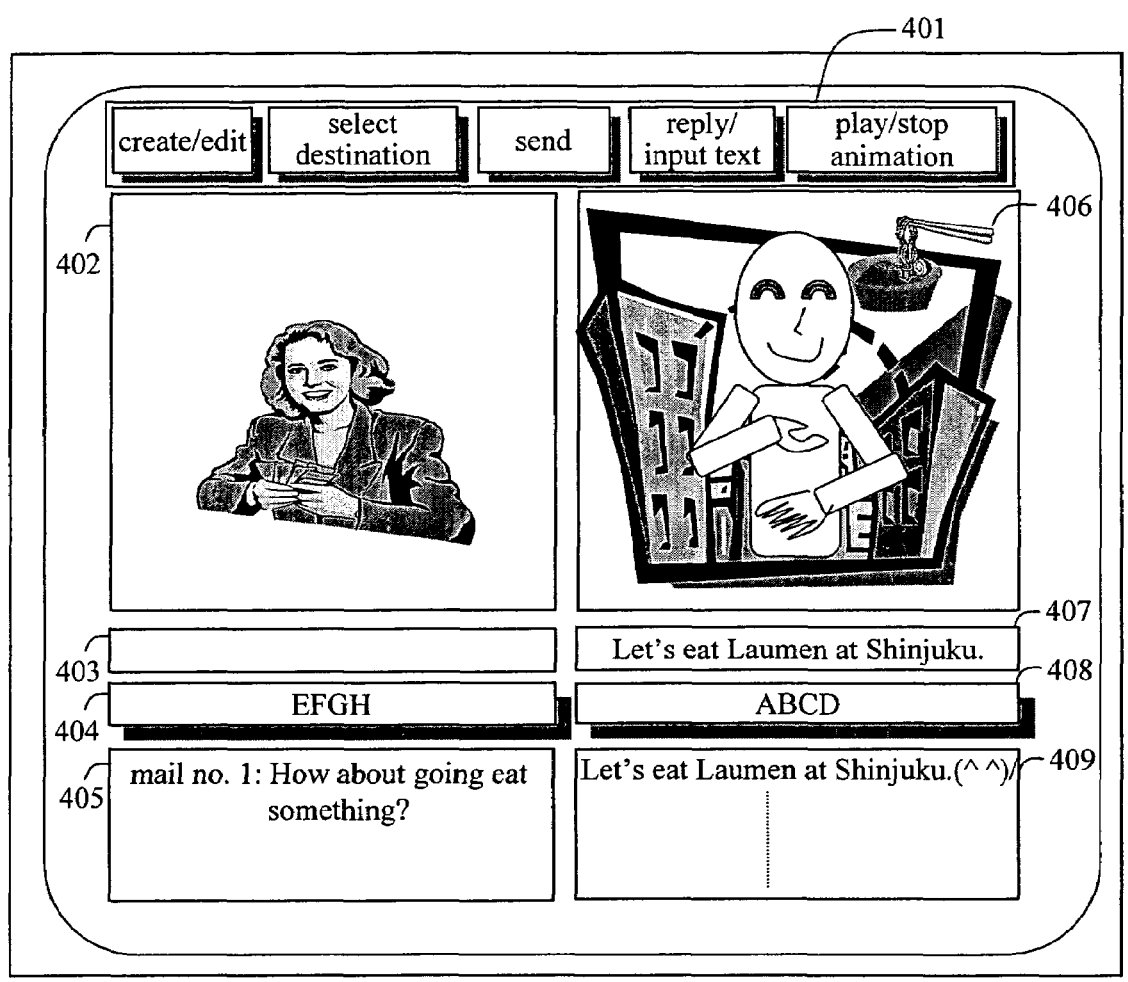
FIG. 11 illustrates an example of the display screen according to the invention.

The sent data File_1 is reproduced on the CG display screen 406 as shown in FIG. 11 (S1809), simultaneously when the mobile terminal 103 receives it, and the inputted text information is also displayed on the mail text display screen 409. Through the reproduction of the animation, the user confirms the created animation mail. Next, as the user selects the 'selection of destination', the address book is displayed. When the user designates the destination from the address book, inputs the mail title, and presses the verification button, the processing returns to the screen of FIG. 11 (S1810). The mail title is sent simultaneously at the moment of sending the File_1.

Further in FIG. 11, as the user presses the 'transmission' button of the menu 401 (S1811), the created animation mail File_1 is sent to the receiving mobile terminal 104 being the destination. Now, on the premise that the animation-mail-oriented user interface program is downloaded into the receiving mobile terminal, and already set up, when a new mail is received, the mail title is added on the mail list display screen 405; and if the user selects the mail title, the sent animation mail File_1 is reproduced. Here, it is possible to omit the animation verification step.

Not only to create the animation data as described above, it is also possible to retrieve the still-picture of the character according to the result of the text analysis, and to serve the retrieved result as a character data. In this case, the character still-picture files are stored in the hard disk to be associated with the tags to identify the files each, and each of the character still-pictures displays the character with various postures. Further, the still-picture/word associating data are stored which associate the Japanese independent words with the names of the tags. By means of the independent word acquired from the text analysis, an associated still-picture is retrieved from the still-picture/word associating data. The still-picture acquired from the retrieval is superimposed on the background data and the object data, in the same manner as the above animation data, and thereby an animation data is created.

When the input text is 'I will wait here for you', for example, the morphological analysis is executed by the above method, and the independent words 'here' and 'wait' are obtained. Next, as these words are collated with the word dictionary data 20203, 'here' is associated with 'place (real-time)'. When a word is associated with the category 'place (real-time)', the current positional information geo is collated with the positional information of the positional information associating dictionary data 20209 as shown in FIG. 12, and thereby the name of the place is specified (S2005). Next, the place name specified by the collation is collated with the word-image associating dictionary data 20208, and the object information and background information associated with the place name are extracted (S2006). The animations are created by the above method; the animation information, the object information, and the background information are superimposed to create an animation file. When the created animation file is sent to the mobile terminal 104 designated as the destination, the animation file received by the mobile terminal 104 is reproduced on the same display screen as that of FIG. 11.

Next, the processing of inputting a typical text will be described. When the text input is carried out using the typical test, the plural texts as shown on the left of FIG. 6 are displayed on the screen (S1803). When the user selects a typical text number 601 by the button, the pointing device, or the finger, and selects the slot portion of the text, as shown on the right of FIG. 6, a word menu 602 associated with the slot portion is displayed. The user selects a desired word from the word menu, or inputs words in the selected slot, and thereafter presses a 'determine' button 603 (S1812). This example assumes that the user selects the typical text number '2', selects a 'XX coffee shop' from the menu as the word to be put within the slot, or inputs words for a 'XX coffee shop' by the button or the pointing device. As the user presses the 'determine' button 603, the processing is transferred to the designation screen for the feeling expression mark, in the same manner as the case with the input of an arbitrary text. As the user selects a desired feeling expression mark and presses the determination button, then the processing returns to the screen for inputting a typical text (S1813). When plural sentences are selected, the selections of typical texts, the information inputs within the slot, and the selections of the feeling expression marks are repeatedly executed.

When the user terminates the input of necessary information on the typical text, and presses a 'termination input' button 604 (S1814), the processing is transferred to the animation mode selection screen. Here, the user is assumed to select the general animation mode. When the general animation mode is selected, the selected typical text number temp[i] and selected or inputted word within the slot slot_word[i][j](i=typical text number, j=slot number), the feeling expression mark Mark[i], and the animation mode "Ani=0" are sent to the mail server 101. Further, the current position at the moment of the determination button being pressed is detected by the position detection function incorporated in the mobile terminal. And, the (x, y) coordinates that give the longitude and the latitude of the current position are stored in the geo[p][q] (p: x-coordinate, q: y-coordinate), which are sent to the mail server 101. In this example, Temp=2 as the typical text number, 'XX coffee shop' as the word within the slot, the feeling expression mark Mark[0]=6, the animation mode "Ani=0", and the current position geo[p][q] are sent (S1815).

Next, using the sent data, the mail server 101 creates an animation file in the same manner as the case with the arbitrary text (S1816). Receiving the sent information, the server starts the input data/animation conversion program 20302, and collates the received data with the typical text data as shown in FIG. 13. First, the number of the inputted typical text is collated with the 'number' of the typical text data (S2101). In this example, the 'number'=2 is checked, temp_num=2 is stored as the collated number in the memory region temp_num, and the movement pattern of the typical text is extracted which corresponds to the number 2 of the typical text data. Then, the movement associated with the movement pattern is created by means of the character already selected, in the same manner as the case with the creation of animation movement by an arbitrary text, which is stored as the character movement file. And, the word within the slot is collated with the word-image associating dictionary data 20208; when 'XX coffee shop' is hit, the object name Cup_1 and the background name Back_XX coffee shop are selected (S2102). If the word-image associating dictionary data do not contain the word identical to the word inputted within the slot, the image file of the same name as the word is retrieved through the Internet in the same manner as the case with the arbitrary text; if it is hit, the file is handled as the object data and/or the background data (S2103). The movement CG is created by the typical text movement pattern data associated with the typical text data being selected, the object data associated with the word within the slot hit in the word-image associating dictionary data, and the animation movement data (S2104).

Next, the selected object data and background data and the created character movement file are superimposed in the same manner as the case with the arbitrary text, which is converted into one animation file, for example, the File_1 of the GIF format, for example. The converted file is sent to the mobile terminal 103 as the transmission source (S1808). The processing after the step 1809 through the step 1811 are the same as the above.

Also, the word within the slot is collated with the word dictionary data 20203. If the place (real-time) in the category name is hit, the current positional information sent is collated with the positional information associating dictionary data 20209 to specify the name of the place (S2105). Further, the specified name of the place is collated with the word-image associating dictionary data 20208; if it is hit, the object data and the background data associated with each other in the dictionary data are extracted (S2106).

On the other hand, when the user selects a word for the slot from the menu among the typical text data, the selected word for the slot is collated with the word listed in the variable part (i) of the slot word menu corresponding to the slot number i, from the 'menu' information being the data listed on the same rank with temp_num of the typical text data. And, if 'XX coffee shop' is hit, through the same process as the case with the above text input, Temp=2 as the typical text number, 'XX coffee shop' as the word within the slot, the feeling expression mark Mark[0]=[6], and the animation mode "Ani=0" are sent to the mail server. The mail server executes the same processing as the case with the text input, sends a created animation file to the mobile terminal; and the user confirms the animation file, designates the destination of transmission, and sends the mail, thus the mobile terminal at the destination will receive the animation file.

Next, the processing of the reply to a sent mail will be described (S1604). The received mail is displayed on the display screen of FIG. 11 (S1901). When the user designates a reply insertion position on the mail text display screen 409 (S1902), and selects the 'reply text input' from the menu 401 on the upper part of the screen (S1903), in the same manner as the selection of the menu 'create', the screen for the user to select the arbitrary text input or the typical text input is displayed. If the arbitrary text input is selected, the screen for inputting an arbitrary text as illustrated in FIG. 5 is displayed; and if the typical text input is selected, the screen for inputting a typical text as illustrated in FIG. 6 is displayed (S1904). The processing thereafter is carried out in the same manner as the case with 'create'; the user inputs text information, 'I will wait for you at 7.00 at Shinjuku', for example, inputs or selects the feeling information, and sends these information to the mail server, and then the mail server creates an animation file, and sends the animation file created to the mobile terminal 104 (S1905).

As the animation file is sent to the mobile terminal 104 being the source of transmission, the animation file sent is displayed on the receiver-side character display screen 402, where the animation file is reproduced.

The inputted text is displayed on the mail text display screen 409. When the user wishes to add a mail, the user designates the reply insertion position on the mail text display screen, presses the 'reply text input', and repeats the operations of inputting the text information and the feeling information. And after finishing the reproduction, when the user presses the menu button 'animation reproduction/halt' without selecting the text from the mail text display screen 409, the animation file already sent from the mobile terminal 103 and the animation file created on the mobile terminal 104 are reproduced according to the display order of the corresponding texts. Here, when the user designates the destination to send the mail, the animation file is sent to the designated address, for example, the mobile terminal 103.

Figure 14:
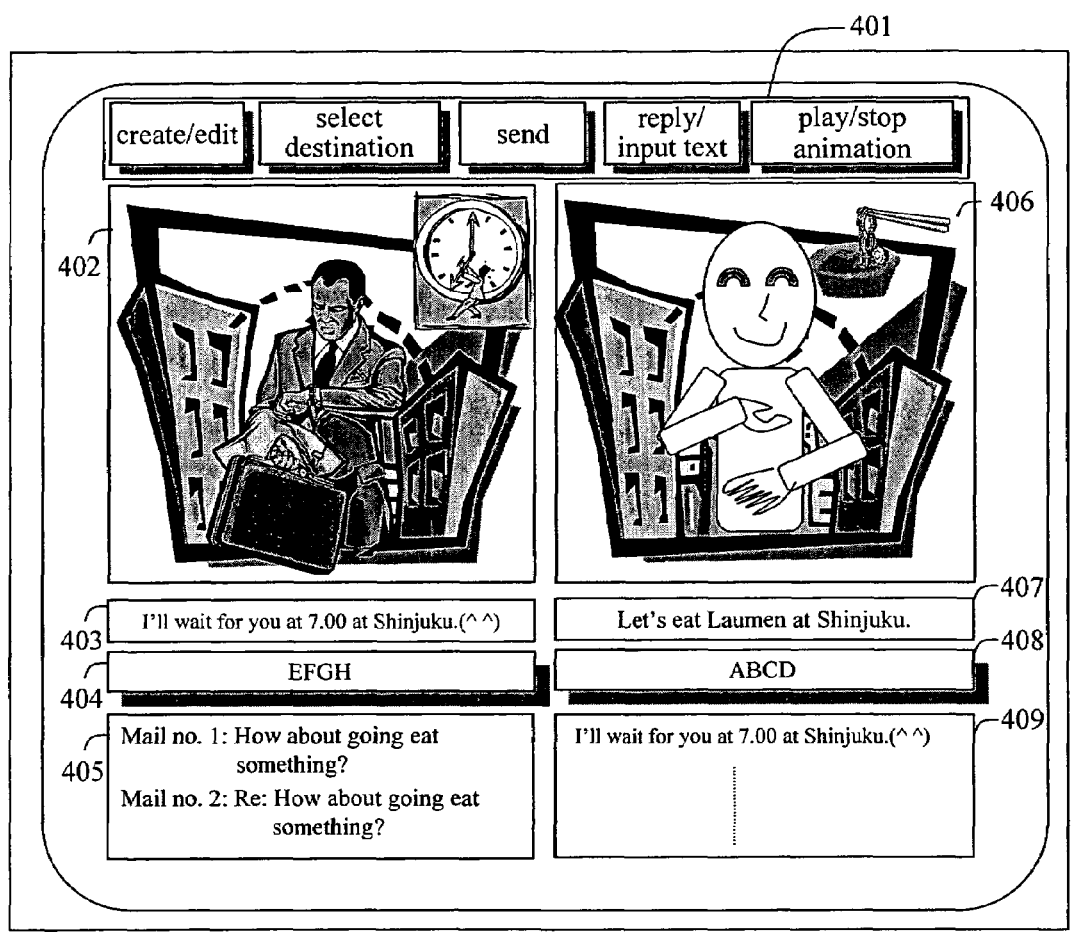
FIG. 14 illustrates an example of the display screen according to the invention.
Figure 15A:
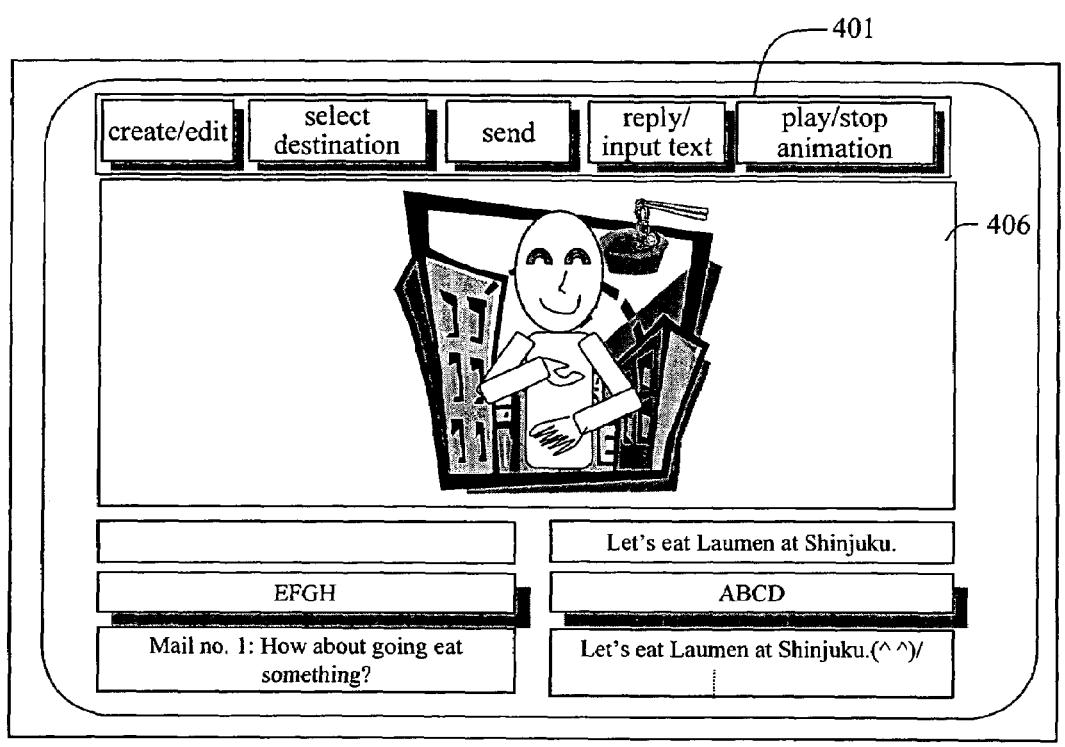
FIG. 15A illustrates an example of the display screen according to the invention.
Figure 15B:
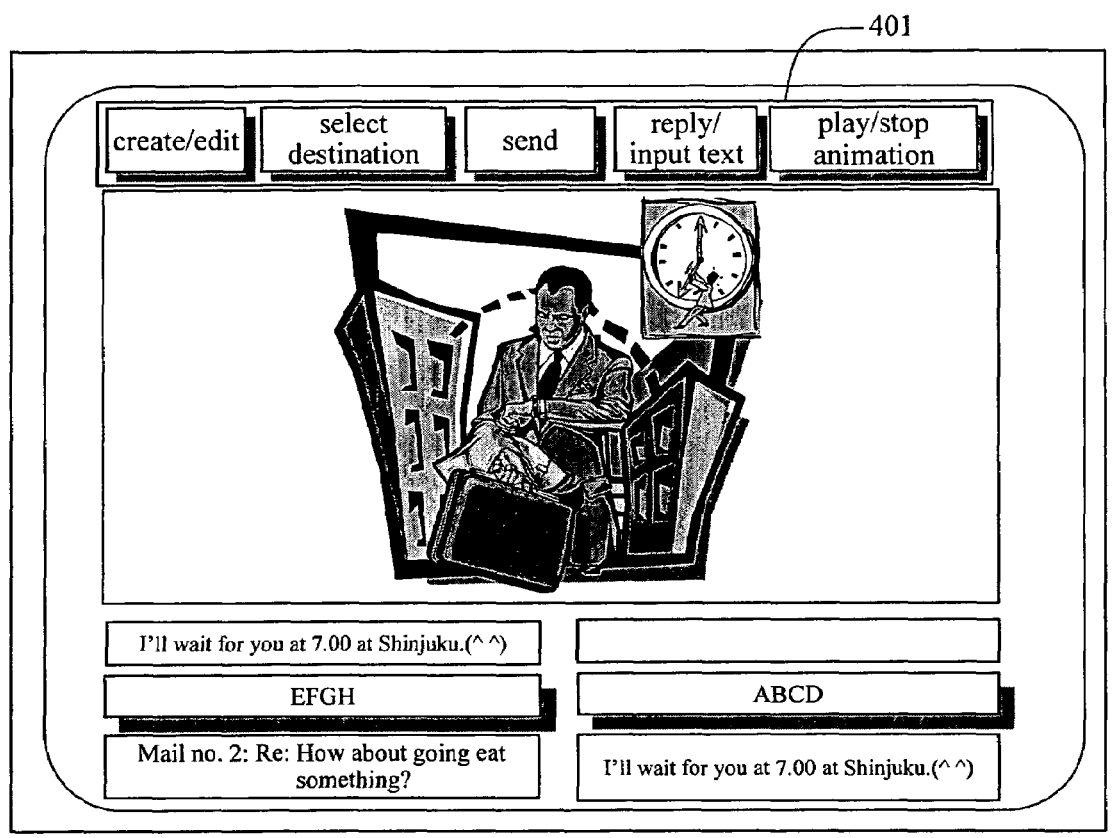
FIG. 15B illustrates an example of the display screen according to the invention.
Figure 16:
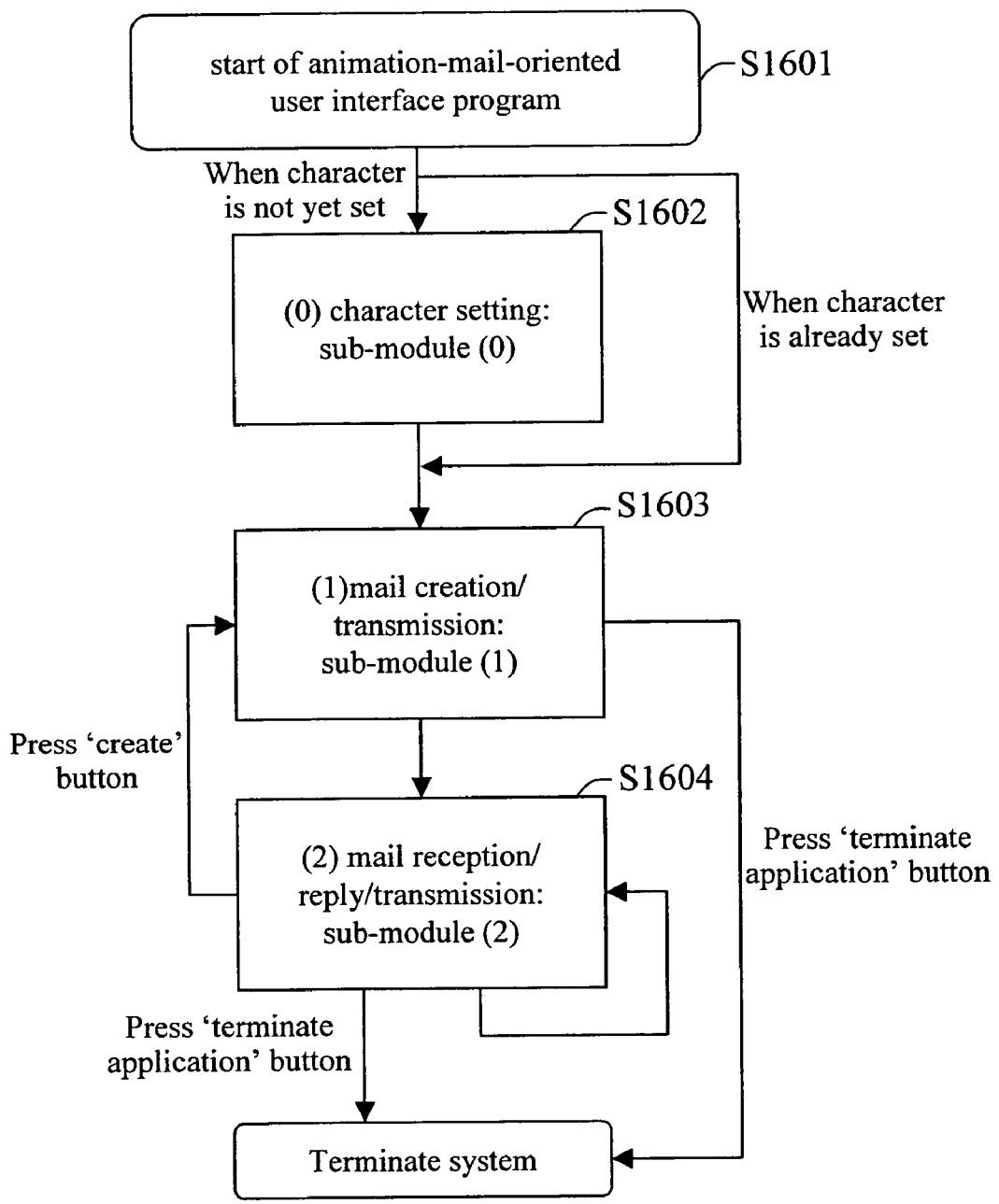
FIG. 16 illustrates an example of the operation flow of the whole system according to the invention.
Figure 17:
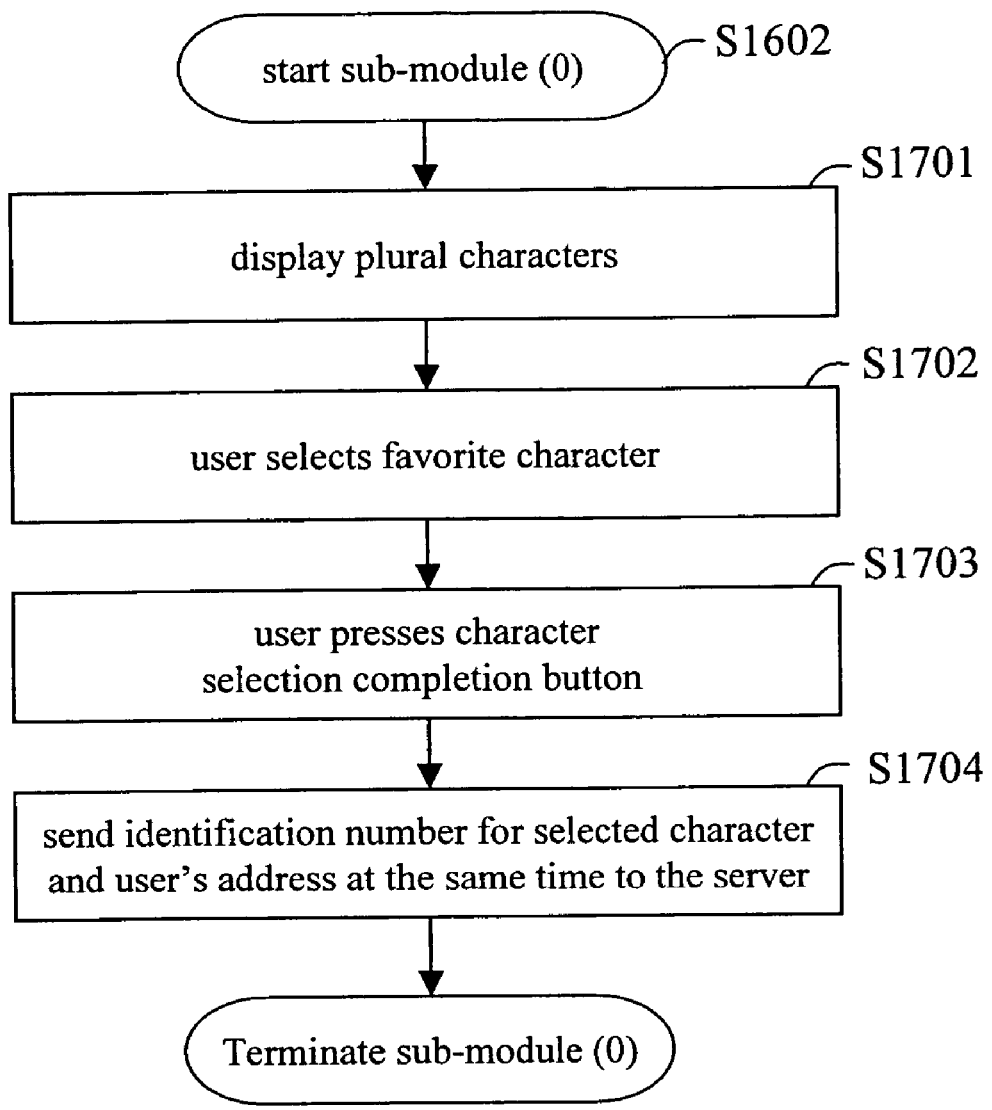
FIG. 17 illustrates an example of the processing flow according to the invention.
Figure 18:
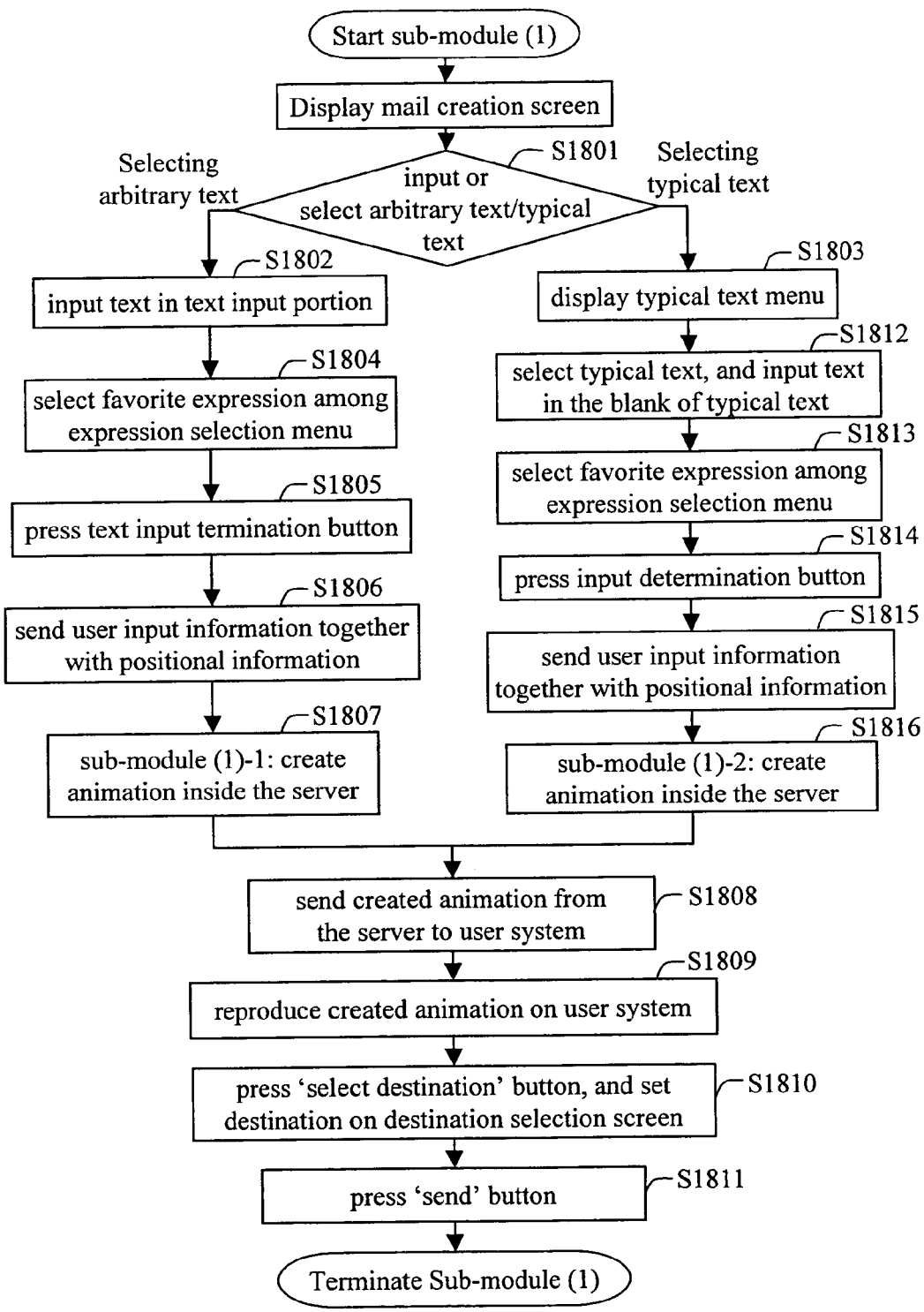
FIG. 18 illustrates an example of the processing flow according to the invention.
Figure 19:
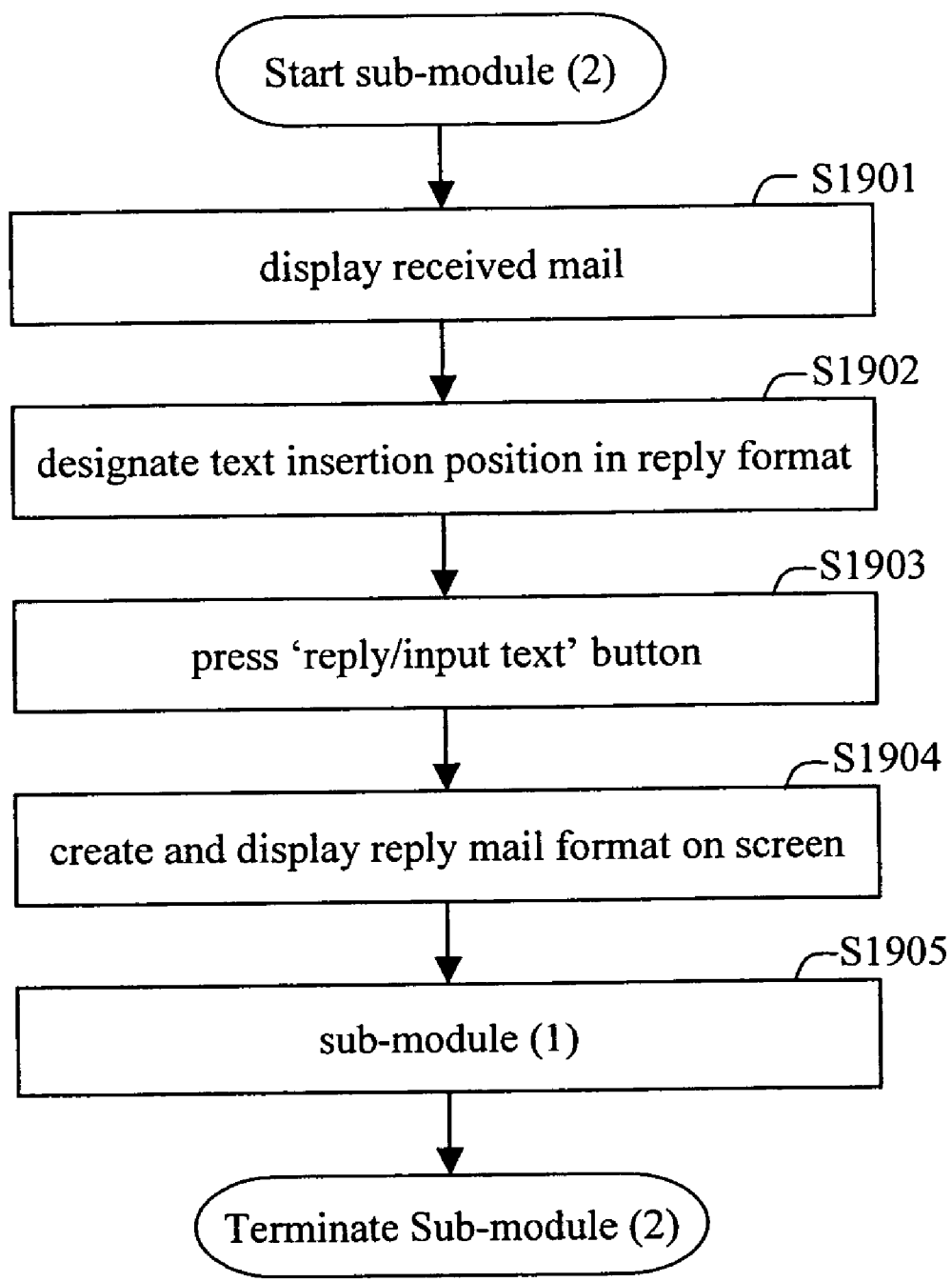
FIG. 19 illustrates an example of the processing flow according to the invention.
Figure 20:
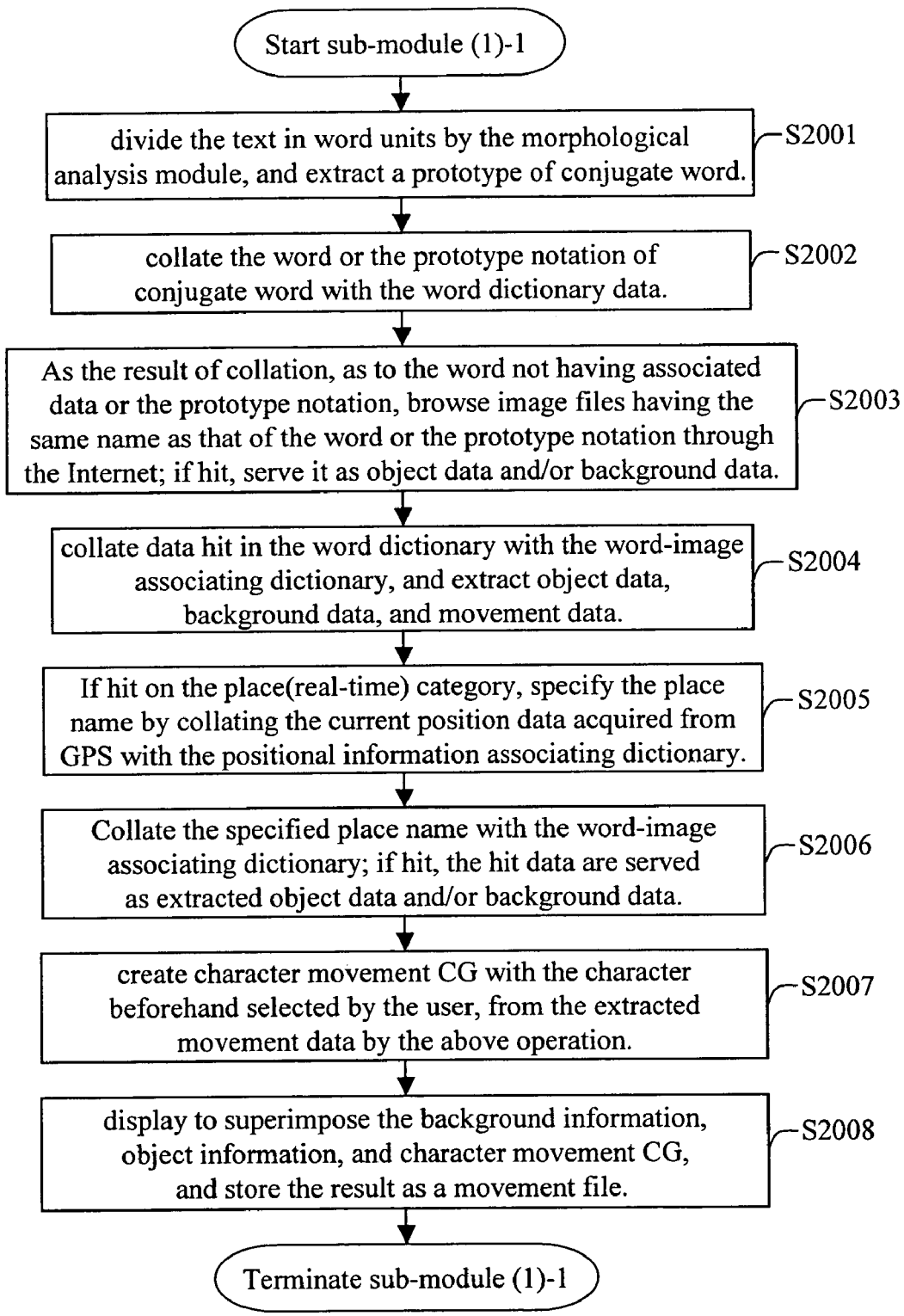
FIG. 20 illustrates an example of the processing flow according to the invention.

On the mobile terminal 103 being the destination, the received mail reproduces the animation on the same display screen as FIG. 14. When three or more characters are displayed, it is possible to provide the character display screens by the number of the characters. Further, as shown in FIG. 15A and FIG. 15B, it is also possible to reproduce the animation file in accordance with the occurrence order of the texts, in a manner that the whole character display screen is occupied by one character.

What is claimed is:

1. A mail server connected to a mobile terminal through a network, the server comprising a control unit and a storage unit, wherein
the storage unit stores a word dictionary containing a plurality of words by category and a word-image associating dictionary associating the words with respective display information thereof by animation character movement, object, and background, and
the control unit controls processes of: receiving, from the mobile terminal, an ID code of the mobile terminal, selected animation character information, text information, and selected feeling expression information; dividing the text contained in the text information into word units; collating each of the word units with the words in the word dictionary; collating each collated word in the word dictionary with the display information in the word-image associating dictionary and extracting collated display information of an associated animation character movement, object, and background; synthesizing an animation image of the selected animation character in a real-time manner using the extracted display information of the associated animation character movement and the selected feeling expression information; creating an animation file in which the synthesized animation image is stored together with the extracted display information of the associated object and the associated background in a superposed manner; and outputting the animation file to the mobile terminal.

2. A mail server according to claim 1, wherein:
the storage unit stores a typical text and a movement pattern associated with the typical text; and
the control unit controls processes of displaying the typical text, receiving the text information to be put in a blank space of the typical text, and synthesizing the image of the animation character by using the movement pattern associated with the typical text in addition to the display information and the feeling expression information associated with the word.

3. A mail server according to claim 1, wherein:
the storage unit stores the ID code of the terminal and predetermined animation character information associated with the ID code; and
the control unit controls processes of reading the predetermined animation character information associated with the received ID code from the storage unit, instead of receiving the selected animation character information.

4. A mail server according to claim 2, wherein:
the storage unit stores the ID code of the terminal and predetermined animation character information associated with the ID code; and
the control unit controls processes of reading the predetermined animation character information associated with the received ID code from the storage unit, instead of receiving the selected animation character information.

5. A mail server according to claim 1, wherein:
the storage unit stores a positional information associating dictionary that stores positional information and place display information associated with the positional information; and
the control unit controls, when the word belongs to a category of place in the word dictionary, a process of extracting the place display information from the positional information associating dictionary by using the positional information acquired from the mobile terminal, and outputting the extracted place display information.

6. A mail server according to claim 2, wherein:
the storage unit stores a positional information associating dictionary that stores positional information and place display information associated with the positional information; and
the control unit controls, when the word belongs to a category of place in the word dictionary, a process of extracting the place display information from the positional information associating dictionary by using the positional information acquired from the mobile terminal, and outputting the extracted place display information.

7. A mail server according to claim 1, wherein, when the word-image associating dictionary does not contain the word, the control unit further controls a process of retrieving an object associated with the word through the network.

8. A mail server according to claim 2, wherein, when the word-image associating dictionary does not contain the word, the control unit further controls a process of retrieving an object associated with the word through the network.

9. A mail server according to claim 3, wherein, when the word-image associating dictionary does not contain the word, the control unit further controls a process of retrieving an object associated with the word through the network.

10. A mail server according to claim 1, wherein the control unit makes the mobile terminal to display plural animation character candidates for a user to select prior to the processes.

11. A mail server according to claim 2, wherein the control unit makes the mobile terminal to display plural animation character candidates for a user to select prior to the processes.

12. A mail server according to claim 1, wherein
when the mail server outputs the animation file to the mobile terminal via an e-mail and receives a reply e-mail from the mobile terminal,
designation information is given in an insertion portion provided in the text of the reply e-mail,
the mail server creates an image of the animation character by using the inputted text information in the reply e-mail, makes the mobile terminal display the animation image created according to the reply e-mail.

13. A mail server according to claim 2, when the mail server outputs the animation file to the mobile terminal via an e-mail and receives a reply e-mail from the mobile terminal,
designation information is given in an insertion portion provided in the text of the reply e-mail,
the mail server creates an image of the animation character by using the inputted text information in the reply e-mail, makes the mobile terminal display the animation image created according to the reply e-mail.

14. A mail server according to claim 1, wherein the control unit analyzes the text information inputted or selected by a user, creates an animation character movement by using the analyzed information, and selects an object and a background by using the analyzed information.

15. A mail server according to claim 12, wherein the control unit edits the animation image based upon the feeling expression information in the reply e-mail.

16. A mail server according to claim 1, wherein the control unit synthesizes the animation image showing a general movement or a sign language movement as selected by a user via the mobile terminal.

17. A computer-readable storage medium embedded with a program for making a mobile terminal having a controller, display, storage, and network interface execute a mail creation processing, wherein the program comprises,

- a module for storing in the storage means a word dictionary containing a plurality of words by category and a word-image associating dictionary associating the words with respective display information thereof by animation character movement, object, and background;
- a module for receiving, from the mobile terminal, text, animation character, and feeling expression information input or selected by a user;
- a module for causing the display means to display plural feeling expression items thereon, and inviting the user to select one of the feeling expression items associated with the text;
- a module for dividing the text contained in the information into word units;
- a module for collating each of the word units with the words in the word dictionary;
- a module for collating each collated word in the word dictionary with the display information in the word-image associating dictionary and extracting collated display information of an associated animation character movement, object, and background;
- a module for synthesizing an animation image of the animation character in a real-time manner using the extracted display information of the associated animation character movement and the feeling expression information; and
- a module for displaying the synthesized animation image on the display means together with the extracted display information of the associated object and the associated background in a superposed manner.

18. A mobile terminal connected to a network, comprising:

- storage means stored with a word dictionary containing a plurality of words by category and a word-image associating dictionary associating the words with respective display information thereof by animation character movement, object, and background;
- a display means;
- a text input means;
- means for dividing a text inputted through the text input means into plural word units;
- means for collating each of the word units with the words in the word dictionary;
- means for collating each collated word in the word dictionary with the display information in the word-image associating dictionary and extracting collated display information of an associated animation character movement, object, and background;
- means for synthesizing an animation image of the animation character in a real-time manner using the extracted display information of the associated animation character movement and the feeling expression information; and
- means for transmitting the animation image to a designated destination through the network.

19. A mobile terminal according to claim 18, wherein the storage means stores information for displaying plural feeling expression items, and uses the feeling expression information selected through the text input means for synthesizing the animation image.

\* \* \* \* \*

UNITED STATES PATENT AND TRADEMARK OFFICE
CERTIFICATE OF CORRECTION

| | | |
|---|---|---|
| PATENT NO. | : 7,308,479 B2 | Page 1 of 1 |
| APPLICATION NO. | : 10/601954 | |
| DATED | : December 11, 2007 | |
| INVENTOR(S) | : Ando et al. | |

It is certified that error appears in the above-identified patent and that said Letters Patent is hereby corrected as shown below:

Title Page, Insert Item (30) For. Appl. Prior:

August 26, 2002  (JP)....................2002-245419

Signed and Sealed this

Third Day of June, 2008

JON W. DUDAS
*Director of the United States Patent and Trademark Office*